United States Patent
Pohl et al.

(10) Patent No.: US 12,479,336 B2
(45) Date of Patent: Nov. 25, 2025

(54) DRIVE APPARATUS FOR ADJUSTING AN INTERIOR ASSEMBLY

(71) Applicant: BROSE FAHRZEUGTEILE SE & CO. KOMMANDITGESELLSCHAFT, BAMBERG, Bamberg (DE)

(72) Inventors: Florian Pohl, Ebersdorf (DE); Christian Herrmann, Grossheirath (DE); Peter Horn, Kemmern (DE); Harald Keller, Königsfeld (DE); Alex Kromer, Stegaurach (DE); Alexander Müller, Bischberg (DE); Markus Rosenthal, Bamberg (DE)

(73) Assignee: BROSE FAHRZEUGTEILE SE & CO. KOMMANDITGESELLSCHAFT, BAMBERG, Bamberg (DE)

( * ) Notice: Subject to any disclaimer, the term of this patent is extended or adjusted under 35 U.S.C. 154(b) by 0 days.

(21) Appl. No.: 18/684,118

(22) PCT Filed: Aug. 22, 2022

(86) PCT No.: PCT/EP2022/073359
§ 371 (c)(1),
(2) Date: Feb. 15, 2024

(87) PCT Pub. No.: WO2023/021223
PCT Pub. Date: Feb. 23, 2023

(65) Prior Publication Data
US 2024/0424958 A1    Dec. 26, 2024

(30) Foreign Application Priority Data

Aug. 20, 2021  (WO) .................. PCT/EP2021/073174
Nov. 17, 2021  (DE) ...................... 10 2021 212 914.5

(51) Int. Cl.
*B60N 2/02*   (2006.01)
*B60N 2/00*   (2006.01)
(Continued)

(52) U.S. Cl.
CPC ........... *B60N 2/0268* (2023.08); *B60N 2/002* (2013.01); *B60N 2/0025* (2023.08);
(Continued)

(58) Field of Classification Search
CPC ..................... B60N 2/0268; B60N 2/02246; B60N 2/0278; B60N 2/04; B60N 2/0239;
(Continued)

(56) References Cited

U.S. PATENT DOCUMENTS 5,004,967 A  *  4/1991  Ogasawara .......... G05B 19/425
                                                     318/568.1
5,065,079 A     11/1991  Ogasawara
(Continued)

FOREIGN PATENT DOCUMENTS

DE         19853156 A1     5/2000
DE     102015013300 A1     4/2016
(Continued)

OTHER PUBLICATIONS

ISA European Patent Office, International Search Report Issued in Application No. PCT/EP2022/073359, Dec. 15, 2022, WIPO, 4 pages.

*Primary Examiner* — Timothy Wilhelm
(74) *Attorney, Agent, or Firm* — McCoy Russell LLP

(57) ABSTRACT

It is provided a drive apparatus for adjusting an interior assembly of a vehicle comprises an electromotive adjustment drive for producing an adjustment force, a self-locking adjustment kinematic mechanism for transmitting an adjustment force produced by the adjustment drive to the interior assembly, which adjustment kinematic mechanism can be
(Continued)

driven by means of the adjustment drive, and a control device for controlling the adjustment drive. The control device is configured to activate an adjustment mode for adjustment of the interior assembly depending on at least one trigger criterion and, when the adjustment mode is activated, to actuate the adjustment drive with a support current of a magnitude such that the interior assembly can put into motion by means of a user force produced manually on the interior assembly by a user, overcoming the self-locking of the adjustment kinematic mechanism.

16 Claims, 5 Drawing Sheets

(51) Int. Cl.
*B60N 2/04* (2006.01)
*B60R 16/037* (2006.01)

(52) U.S. Cl.
CPC ....... *B60N 2/02246* (2023.08); *B60N 2/0228* (2013.01); *B60N 2/0239* (2023.08); *B60N 2/0276* (2013.01); *B60N 2/0278* (2023.08); *B60N 2/04* (2013.01); *B60R 16/037* (2013.01); *B60N 2210/12* (2023.08); *B60N 2210/20* (2023.08); *B60N 2210/22* (2023.08)

(58) Field of Classification Search
CPC .... B60N 2/002; B60N 2/0228; B60N 2/0025; B60N 2/0276; B60N 2210/12; B60N 2210/20; B60N 2210/22; B60N 2/0248; B60N 2/0226; B60R 16/037
See application file for complete search history.

(56) References Cited

U.S. PATENT DOCUMENTS

| | | | | |
|---|---|---|---|---|
| 6,195,603 B1 * | 2/2001 | Gauger | ................ | B60N 2/067 296/68.1 |
| 6,243,635 B1 * | 6/2001 | Swan | .................. | H03H 7/0115 296/65.01 |
| 6,538,405 B1 * | 3/2003 | Brzozowski | ....... | H05K 7/14322 303/20 |
| 6,578,917 B1 | 6/2003 | Aubert et al. | | |
| 7,099,761 B2 * | 8/2006 | Woller | ............... | B60N 2/02253 296/68.1 |
| 7,432,459 B2 * | 10/2008 | Stoschek | .............. | B60N 2/0237 200/512 |
| 8,035,328 B2 * | 10/2011 | Noda | ..................... | G05B 19/19 318/434 |
| 9,713,967 B2 * | 7/2017 | Bonk | ..................... | B60N 2/206 |
| 10,442,317 B2 * | 10/2019 | Koh | ..................... | B60N 2/0252 |
| 11,247,584 B2 * | 2/2022 | Breitweg | ............. | B60N 2/0248 |
| 11,897,403 B2 * | 2/2024 | Ostrowski | ........... | B60N 2/0023 |
| 2008/0189053 A1 * | 8/2008 | Breed | ..................... | G01S 7/417 702/41 |
| 2009/0088930 A1 * | 4/2009 | Ohtsubo | .............. | B60N 2/0252 297/316 |
| 2011/0285186 A1 * | 11/2011 | Demmelmeier | ..... | B60N 2/0277 701/49 |
| 2016/0101710 A1 | 4/2016 | Bonk et al. | | |
| 2017/0166089 A1 * | 6/2017 | Frye | ......................... | B60N 2/16 |
| 2017/0334451 A1 * | 11/2017 | Asakura | ............... | B60W 10/04 |
| 2020/0139853 A1 | 5/2020 | Nawrocki et al. | | |
| 2022/0290481 A1 * | 9/2022 | Kromer | ................. | E05F 15/627 |
| 2024/0208372 A1 * | 6/2024 | Herrmann | ............ | B60N 2/0277 |

FOREIGN PATENT DOCUMENTS

| | | | | |
|---|---|---|---|---|
| DE | 102014119628 A1 | | 6/2016 | |
| DE | 102016207524 A1 | | 11/2017 | |
| DE | 102017215929 A1 | | 3/2019 | |
| DE | 102020201014 A1 | * | 7/2021 | |
| DE | 102020210656 A1 | | 2/2022 | |
| EP | 1078808 A1 | | 2/2001 | |
| EP | 1535768 A2 | | 6/2005 | |
| WO | WO-2004098945 A1 | * | 11/2004 | ........... B60N 2/0228 |
| WO | 2021023760 A1 | | 2/2021 | |
| WO | 2022038276 A1 | | 2/2022 | |

* cited by examiner

DRIVE APPARATUS FOR ADJUSTING AN INTERIOR ASSEMBLY

CROSS REFERENCE TO RELATED APPLICATIONS

The present application is a U.S. National Phase of International Application No. PCT/EP2022/073359 entitled "DRIVE APPARATUS FOR ADJUSTING AN INTERIOR ASSEMBLY," and filed on Aug. 22, 2022. International Application No. PCT/EP2022/073359 claims priority to International Application No. PCT/EP2021/073174 filed on Aug. 20, 2021 and German Patent Application No. 10 2021 212 914.5 filed on Nov. 17, 2021. The entire contents of each of the above-listed applications are hereby incorporated by reference for all purposes.

BACKGROUND

The proposed solution relates to a drive apparatus for adjusting an interior assembly of a vehicle and to a method for controlling a drive apparatus for adjusting an interior assembly of a vehicle, and to a computer program product.

A drive apparatus of this kind comprises an electromotive adjustment drive for generating an adjustment force, a self-locking adjustment kinematic mechanism for transmitting an adjustment force generated by the adjustment drive to the interior assembly, which adjustment kinematic mechanism can be driven by means of the adjustment drive, and a control device for controlling the adjustment drive.

An interior assembly of the type described here is an assembly in the interior of a vehicle. An interior assembly of the type described here can for example be a vehicle seat, a console element having a storage or resting function, a monitor, a partition wall, or a rest such as a table or a storage compartment. The interior assembly is not part of the vehicle body, and in this respect does not serve for closing the vehicle towards the outside (as is the case for a vehicle door or a sunroof). The interior assembly is also not part of a drive and steering system of the vehicle (such as a steering column of a vehicle). The interior assembly is arranged in the interior of the vehicle and can be adjusted in the interior by a user, in particular in order to provide a comfort function in the interior.

For example, a vehicle seat can be adjustable for setting a backrest tilt, a longitudinal and/or transverse position, or also for setting a rotational position in the interior, in order to allow a vehicle occupant a comfortable sitting position. A console element can for example be displaceable along a vehicle floor, in order to provide a rest in the interior of the vehicle or to enable actuation of a functional assembly on the console element. It can be possible to set the pivot position, height position and/or tilt position of a monitor, in order to enable comfortable viewing of the monitor for a vehicle occupant.

In particular in the case of novel interior concepts, for example in connection with self-driving vehicles, interior assemblies such as vehicle seats or console elements can be adjustable in a variable manner, in order to optionally enable vehicle occupants comfortable travel in the vehicle. In this case, the adjustment of an interior assembly is intended to be able to be performed in a simple, comfortable and intuitive manner by a user.

A vehicle seat in the interior of a vehicle, which seat is electrically adjustable, is known from US 2017/0166089 A1. The adjustment of the vehicle seat can be initiated using gesture control, by a user, for example in that a user performs a predetermined gesture in the region of the vehicle seat and can thereby for example bring about tilting of a backrest or a longitudinal adjustment of the vehicle seat in the vehicle interior.

In the case of known adjustment concepts, it can be provided for sensors for detecting for example a user gesture to be provided in the interior of a vehicle, in order to enable an adjustment movement of an interior assembly, for example a vehicle seat, on the basis of a detected user gesture. This requires a comparatively complex sensor system, and furthermore complex control, which must ensure that a user gesture is reliably identified in order to enable an adjustment movement for a user in a comfortable manner, but simultaneously also to prevent an undesired adjustment on account of a possibly incorrectly identified gesture.

SUMMARY

The object underlying the proposed solution is to provide a drive apparatus for adjusting an interior assembly in a vehicle, a method, and a computer program product, which can make simple, comfortable and intuitive adjustment of the interior assembly possible for a user.

This object is achieved by a subject matter having features as described herein.

According thereto, the control device is configured to activate an adjustment mode for adjustment of the interior assembly depending on at least one trigger criterion and, when the adjustment mode is activated, to actuate the adjustment drive with a support current of a magnitude such that the interior assembly can put into motion by means of a user force produced manually on the interior assembly by a user, overcoming the self-locking of the adjustment kinematic mechanism.

In the drive apparatus, the electromotive adjustment drive is configured to produce an adjustment force which is introduced into the interior assembly via the adjustment kinematic mechanism in order to electromotively adjust the interior assembly or to at least electromotively assist an adjustment. In this case, the adjustment kinematic mechanism, which comprises a transmission, is configured to be self-locking, such that when the adjustment drive is not energized, the interior assembly is held in position by the adjustment kinematic mechanism alone, and thus a force introduced on the output side cannot lead to an adjustment of the interior assembly.

In mechanics, self-locking is understood to mean a resistance against slipping or twisting of two bodies resting against one another, which resistance is caused by friction. In the case of a transmission or gear mechanism, self-locking exists when the transmission can be driven by the drive shaft but not by an output shaft. Self-locking in the case of transmissions is typically set by a high gear ratio or by low efficiency (typically <50%). In the case of a worm gear or a spindle gear, self-locking is typically achieved when a lead angle of a worm thread or a spindle thread is smaller than the arc tangent of the static friction coefficient.

The adjustment kinematic mechanism is preferably dynamically and statically self-locking. A torque on the output side cannot, alone, bring about a movement of the adjustment kinematic mechanism, either in the case of dynamic movement or in the static rest state.

While in the case of a non-energized adjustment drive the interior assembly is held in position by the adjustment kinematic mechanism and thus likewise cannot be adjusted by user force brought about on the interior assembly on the output side, the interior assembly can be caused to move manually when the adjustment drive provides a support current, in an adjustment mode, and thereby the self-locking of the adjustment kinematic mechanism is removed. For this purpose, the control device is configured to activate the adjustment mode depending on a trigger criterion, and, when the adjustment mode is activated, to supply a support current to the adjustment drive which causes the self-locking of the adjustment kinematic mechanism to be removed. This leads to a manual user force on the interior assembly resulting in a movement on the interior assembly, and the interior assembly can thus be caused to move by manual user force. Feeding the adjustment drive with the support current thus releases the inherently self-locking adjustment kinematic mechanism and enables it to be moved by introduction of an output-side force.

The adjustment kinematic mechanism can implement a worm gear or a spindle gear for example. In the case of a worm gear, a drive worm is in transmission engagement with a drive wheel via a worm gearing. In the case of a spindle gear, a spindle comprises a spindle thread which is in threaded engagement with an internal thread of a spindle nut, wherein rotating the spindle or, alternatively, rotating the spindle nut, can bring about a longitudinal movement of the spindle nut relative to the spindle.

An adjustment of the interior assembly should not be possible all the time, but rather only in certain situations. For this purpose, the control device evaluates one or more trigger criteria in order to determine, depending on the trigger criteria, whether the adjustment mode should be activated or not. If one or more trigger criteria are present, then the adjustment mode is started, and, accordingly, the control device feeds the adjustment drive with the support current, such that the self-locking of the adjustment kinematic mechanism is overcome by an adjustment force provided by the adjustment drive on the adjustment kinematic mechanism, and thus the interior assembly can be caused to move by a manual user force introduced on the interior assembly on the output side.

Since the adjustment mode can be started depending on one or more trigger criteria, a sensor system for initiating the adjustment mode and for identifying an adjustment wish can be simplified. In particular, a sensor system that monitors and evaluates user gestures is not required. The adjustment mode can be started on the basis of criteria that are comparatively simple to determine, for example an opening state of a vehicle door or an occupancy state of a vehicle seat, wherein after activating the adjustment mode a user interaction can be identified for example on the basis of a movement of the interior assembly, for example using Hall sensors (present in any case) of the adjustment drive for detecting the movement of a motor shaft.

Since a movement identification on the interior assembly thus does not require any complex sensor system, the control and evaluation as a whole can be simplified.

In one embodiment, the support current is of such a magnitude that an adjustment force brought about by the support current does not move the interior assembly. Upon activation of the adjustment mode, the adjustment drive is thus energized in such a way that an adjustment force is provided at the adjustment kinematic mechanism for overcoming the self-locking, but the adjustment kinematic mechanism is not moved by the support current and thus the interior assembly is also not adjusted. Thus, energization with the support current upon activation of the adjustment mode overcomes (only) the self-locking, but no adjustment movement occurs yet.

Alternatively, upon activation of the adjustment mode the interior assembly can be moved at a movement speed below a limit speed. The interior assembly is thus slowly caused to move, wherein the actual adjustment movement can be started by (quicker) adjustment of the interior assembly by user interaction on the interior assembly.

The limit speed can for example be in a range between $1/10000$ m/s and $1/100$ m/s.

In one embodiment, the support current is of such a magnitude that an adjustment force brought about by the support current should not move the interior assembly. In this case, a check is made, after activation of the adjustment mode, as to whether the interior assembly is starting to move. If this is the case, for example because a load is acting on the interior assembly, the adjustment mode is terminated. Thus, after activation of the adjustment mode a standstill must be present for a predetermined time (e.g. 1 s), for example, in order to subsequently validly start the adjustment mode.

The energization with the (preferably pulse-width modulated) support current thus takes place with such low energy that the interior assembly does not yet move or, alternatively, that the adjustment drive, and accordingly also the interior assembly, for example slowly begin to move. If a user engages on the interior assembly, then the user can adjust the interior assembly by a user force, because the self-locking of the adjustment kinematic mechanism is removed by the support current (at least in one movement direction).

In the energization, a transition from static friction (in the case of standstill) to sliding friction (in the case of movement) can be taken into account. Thus, in order to cause the interior assembly to move, firstly a current pulse of greater current strength can be fed in, until the interior assembly moves (taking into account and overcoming play). Then, during a slow movement, the feed can be at a lower current value.

In one embodiment, the control device is configured to set the support current by pulse-width modulation. In this case, the support current can be set using a comparatively small load factor, for example between 1% and 10%, and is thus set to a comparatively low effective value.

Instead of setting the current by means of pulse-width modulation, it is also conceivable to set it by means of a linear regulator.

In one embodiment, the control device is configured to set the support current, in the adjustment mode, on the basis of a fixedly predetermined value. The value can for example be hard-programmed and is thus invariable during operation. On the basis of the fixedly predetermined value, the support current is set upon activation of the adjustment mode.

Instead of being set to a constant value, the support current can also be set in a manner dependent on the adjustment path, or on the basis of a curve or table, in order to compensate peculiarities of kinematics (e.g. in the case of a wobble mechanism).

In one embodiment, the value of the support current can be calibrated, wherein for this purpose the control device performs a calibration routine and determines the value of the support current within the context of the calibration routine. The control device can be configured to perform the calibration routine once before the drive apparatus is put into operation. The control device can additionally or alternatively be configured to perform the calibration routine repeatedly, wherein the calibration routine is performed outside of the actual adjustment mode, in order to determine the value of the support current.

The calibration routine can for example be performed such that the control device increases the current of the adjustment drive from 0, and determines the current value from which a movement occurs on the adjustment drive and the downstream adjustment kinematic mechanism. The value of the support current is then for example set to such a value at which there is not quite yet a movement on the adjustment drive. The movement of the adjustment drive can for example be monitored using Hall sensors of the adjustment drive, such that no additional sensor system is required for the calibration.

In one embodiment, the control device is configured to energize the adjustment drive alternately, in different adjustment directions, when the adjustment mode is activated. The control device thus feeds the adjustment drive with a support current alternately in one or the other movement direction, wherein the support current value can be the same in both movement directions or the support current value is different depending on the movement direction. The alternating energization, for example having an energization duration in each movement direction of between 0.1 seconds and 1 second, for example 0.5 seconds, makes it possible that a manual adjustment of the interior assembly in both movement directions can be made possible, and thus the self-locking is released alternately in both movement directions. If a user interaction for a movement of the interior assembly in a particular movement direction is identified, then subsequently a support current can be provided for example exclusively in the identified movement direction, such that the interior assembly can be adjusted in the identified movement direction by user force.

In the case of the alternating movement, a reverse play (or also resiliency) in the kinematics mechanism can be taken into account. A reverse play of this kind can lead to Hall counts occurring on the motor shaft, without the interior assembly moving.

In the adjustment mode, manual adjustment of the interior assembly is possible. In this case, different operating modes for manual adjustment are conceivable and possible in the adjustment mode.

In one operating mode, in the adjustment mode the self-locking of the adjustment kinematic mechanism can be removed by energizing the adjustment drive with the support current, wherein no further control takes place, and thus the adjustment of the interior assembly takes place purely manually, by action of a user on the interior assembly. A further, electromotive support of the adjustment beyond the energization, for overcoming the self-locking, thus does not occur. A particularly simple operating mode results, in which no further control for manual adjust is required.

In another operating mode, a user interaction can be identified in the adjustment mode, in order to then perform a further control on the basis of an identified user interaction.

In one embodiment, the control device is configured to identify a user interaction on the interior assembly on the basis of a movement of the interior assembly, when the adjustment mode is activated. The movement of the interior assembly can be identified using Hall sensors of the adjustment drive, in that in the event of a movement of the interior assembly the adjustment kinematic mechanism (released from self-locking by the support current) and the adjustment drive are also moved, and thus a movement of the motor shaft can be identified and evaluated by Hall sensors on the motor shaft of the adjustment drive.

Instead of on the basis of a movement, a user interaction can be identified for example on the basis of a motor characteristic value, for example on the basis of the motor current or the motor voltage. In the case of voltage control, for example the current drops upon movement. In contrast, in the case of current control, the voltage drops. An identification can for example also take place on the basis of a motor ripple identifiable in the current.

In the case of identified user interaction, the control device can for example be configured to switch into servo operation. In this case, the control device is configured to actuate the adjustment drive, in the servo operation, for providing a supporting force in the case of a manual adjustment of the interior assembly by a user. The adjustment of the interior assembly (for example in the form of a vehicle seat, a console element, a monitor, a partition wall, a rest, a storage compartment, or the like) thus takes place in principle manually by a user, but with electromotive support by the drive apparatus in servo operation. Thus, for adjusting the interior assembly, a user does not have to provide the entire force required for overcoming loads acting on the interior assembly, but rather only a partial force. This enables intuitive, comfortable adjustment of the interior assembly by a user, in the case of electromotive support by the drive apparatus. This furthermore enables quick and variable adjustment, at a low force that is to be applied by a user. The adjustment of the interior assembly, for example of a vehicle seat, can thus be brought about in that a user engages on the interior assembly and thereby acts on the interior assembly for adjustment into a desired position, wherein the user has to apply only a low force for the adjustment, and a further force required is provided by the electromotive drive apparatus.

In another operating mode, the control device can be configured to actuate the adjustment drive in a nudging operation for moving the interior assembly after an impulse on the interior assembly brought about by a user, wherein the control device is configured to identify a user interaction on the interior assembly, when the adjustment mode is activated, and to start the nudging operation on the basis of an identified user interaction. Within the context of a nudging operation of this kind, a user can nudge the interior assembly by applying an impulse to the interior assembly, such that the interior assembly is caused to move. Since the self-locking of the adjustment kinematic mechanism is released, the interior assembly moves automatically after the nudging, wherein the control device can for example control the movement of the interior assembly in such a way that the interior assembly is moved automatically, i.e. without further application of a user force, until it is in a defined position. In this case, after the user interaction has been identified, the current of the adjustment drive can be controlled in such a way that the current is for example increased, and the interior assembly is thus for example moved at a predetermined, controlled movement speed until it is in an end position.

The interior assembly can for example be pivotable about a pivot axis and/or displaceable along a longitudinal direction. If the interior assembly is formed by a vehicle seat for example, then the vehicle seal as a whole can be adjustable along a vehicle floor, for example along a vehicle longitudinal direction and/or along a vehicle transverse direction. In addition or alternatively, the vehicle seat can be rotatable about a vehicle vertical direction, such that the rotational position of the vehicle seat in the vehicle interior can also be adapted. Furthermore, optionally, assemblies of the vehicle seat, for example a backrest part or a seat surface, are adjustable, for example in order to adapt a tilt and/or a height position.

An adjustability can also be provided on other interior assemblies such as on a console element. A console element can for example be displaceable along a vehicle floor, wherein optionally a height position of the console element or a rotational position can also be adaptable. A monitor can for example be variable with respect to its pivot position, its rotational position, its height position and its tilt.

The adjustment movements of the interior assembly as a whole or of individual (sub-) assemblies of the interior assembly can be brought about by one or more drive apparatuses, wherein the adjustment is performed manually by a user and is assisted electromotively by a respective drive apparatus.

The adjustment mode, within which the adjustment of the interior assembly by a user is possible, can for example be ended again after a predetermined time. Alternatively, a termination of the adjustment mode can be ended after a predetermined time after an adjustment action.

In turn, the adjustment mode can be ended when an electrical adjustment is introduced, for example at the push of a button in automatic operation.

A trigger criterion can for example be an occupancy state of the interior assembly. If the interior assembly is for example a vehicle seat or an assembly of a vehicle seat, for example the backrest of a vehicle seat, then the control device makes available the adjustment mode for example only when the vehicle seat is not occupied by a vehicle occupant. The backrest should be adjustable for example only in the case of an empty vehicle seat. In this case, the occupancy state can for example be evaluated on the basis of a (capacitive) occupancy sensor, on the basis of a state of a belt lock, or also by an interior monitoring device.

A trigger criterion can also be a movement state of the interior assembly. If for example a front vehicle seat is moved, then for example a drive apparatus on a rear vehicle seat or on a central console can be switched into the adjustment mode, in order to allow a movement on the rear vehicle seat or the central console.

Another trigger criterion can be the opening state of a vehicle door, in particular a vehicle side door or a tailgate. For example, the control device can be configured to activate the adjustment mode as soon as a vehicle side door is opened. If for example the right-hand, rear vehicle side door is opened, then the adjustment mode can be started for a vehicle seat to the right and back and/or to the right and forward. If, in contrast, the left-hand, rear vehicle side door is opened, then for example the adjustment mode is started for a vehicle seat to the left and back and/or to the left and forward. If it is determined that the tailgate is opened, then the adjustment mode can be started for example for a rear seat row in a vehicle.

As an additional criterion, a vehicle state of the vehicle can be evaluated. Thus, the adjustment mode can for example be possible only when the vehicle is stationary. Alternatively, the adjustment mode can be activated when the vehicle is stationary, but optionally also during travel. In this case, during travel of the vehicle the adjustment mode can be prohibited in a situation-dependent manner, for example depending on the travel speed of the vehicle or in the case of what is known as a "precrash" warning, which indicates a possibly impending crash. If, in the case of such a "precrash" warning, the drive apparatus is currently in the adjustment mode, then the adjustment mode can be deactivated and the interior assembly can be locked in the position it has currently assumed, in order to possibly be able to absorb and conduct away crash forces.

As another trigger criterion, for example a sensor signal of a sensor device, for example an interior monitoring device (for example of a radar or lidar system) or of a movement sensor on an interior assembly, can also be evaluated.

Further trigger criteria can be: adjustment of a neighboring interior assembly, actuation of the vehicle ignition, a dedicated user action (e.g. actuating a button on the seat or on the menu in the onboard computer, or a voice command).

Deactivation of the adjustment mode after a trigger criterion or a combination of trigger criteria can for example take place: when a trigger criterion is no longer present; after an adjustment has taken place; in a time-controlled manner; when the vehicle is parked, for example on the basis of a "power budget".

In one embodiment, the control device is configured to produce an indication signal as an indication of the adjustment mode for output to a user, after activation of the adjustment mode. Thus, the control device can for example produce an indication signal, which is output via a vehicle device, such as an audio system of the vehicle, in order to signal to the user that the adjustment mode for adjusting has been started. In addition or alternatively, the indication signal can consist in the control device actuating the adjustment drive for moving the interior assembly for example with a slow movement speed or by producing a vibration movement on the interior assembly in a manner perceptible for a user. In addition or alternatively, again, the control device can for example produce a modulated energization signal of this kind and output it to the adjustment drive, such that the adjustment drive is excited to a predetermined noise generation, for example for generating sounds. The adjustment drive is thus energized in such a way that a signal in the audible range is produced at the adjustment drive.

The adjustment drive can be configured for example as a direct current motor, particularly advantageously as a brushless direct current motor.

The control device can be integrated into the adjustment drive, but can also be configured separately from the adjustment drive, for example by a seat controller or a central controller in the vehicle.

In one embodiment, the control device comprises a current regulation module for regulating a current of the adjustment drive. When the adjustment mode is activated, the current regulation module can in particular regulate the support current to a defined (predetermined or calibrated) value in such a way that the self-locking of the adjustment kinematic mechanism can be removed and thus the interior assembly can be caused to move manually.

Thus, for example a current regulation advantageously takes place for actuating the adjustment drive, wherein it is noted that, alternatively, for example a voltage regulation can also take place, and thus the regulation of the adjustment drive is not limited to a current regulation.

In one embodiment, the control device comprises an actuation module for determining a target value depending on a load acting on the interior assembly. In this case, the current regulation module is configured to regulate the current of the adjustment drive on the basis of the target value fed by the actuation module.

Upon activation of the adjustment mode, the actuation module can adapt the value of the support current in such a way that for example a gravitational force is also taken into account, in a manner dependent on the position of the vehicle, and the support current is thus set in a manner independent of movement direction, such that the gravitational force is (also) compensated. The actuation module thus specifies a target value for the current, which is set on the basis of the predetermined value of the support current, but in this case adapted on the basis of additional parameters, for example on the basis of the vehicle tilt and/or pitch.

Furthermore, in a servo operation the actuation module can specify the target value for the current in such a way that the force provided by the adjustment drive supports the user in the movement of the interior assembly in such a way that the force to be applied by the user is as far as possible at least approximately the same (or follows a desired curve) and an adjustment of the interior assembly that is comfortable and pleasant to the touch, for a user, thus results.

In one embodiment, the control device additionally comprises a load calculation module, which is connected upstream of the actuation module and serves for determining a load acting on the interior assembly. The load is a force acting on the interior assembly independently of an applied user force, which can in particular counteract an adjustment of the interior assembly (or optionally also support the movement of the interior assembly) and can depend for example on the vehicle position, an adjustment direction of the interior assembly, and a current adjustment position of the interior assembly.

The load calculation module can in particular be configured to determine a static and/or dynamic load acting on the interior assembly. The load can for example be determined depending on a tilt angle of the vehicle measured about the vehicle longitudinal axis, a tilt angle of a pivot axis of the interior assembly measured about the vehicle longitudinal axis, a pitch angle of the vehicle measured about a vehicle transverse axis, a pitch angle of the pivot axis of the interior assembly measured about the vehicle transverse axis, and/or an opening angle of the interior assembly.

Gravitational forces act on the interior assembly depending on the tilt of the vehicle (measured about the vehicle longitudinal axis, also referred to as the roll angle) and/or depending on the gradient of the vehicle (measured about the vehicle transverse axis, also referred to as the pith angle). Such gravitational forces can for example act in the direction of a desired adjustment movement or opposingly to the adjustment movement. If the gravitational force acts counter to the adjustment, in the case of an adjustment of the interior assembly a user must for example work against a force acting on the interior assembly due to gravity, wherein the supporting force provided by the adjustment drive should preferably be set such that, for example in servo operation, the force to be applied by the user remains the same irrespective of the position of the vehicle and the position of the interior assembly, or follows a desired curve. The supporting force to be provided by the adjustment drive thus changes with the vehicle position and the position and adjustment direction of the interior assembly, and is correspondingly specified such that preferably an at least approximately constant adjustment force results, for a user, in servo operation.

Additionally, friction forces can act on the interior assembly, which forces can also be taken into account by the load calculation module for calculating the load acting on the interior assembly.

Additionally or alternatively, the temperature or an ageing state can also be taken into account.

In one embodiment, the actuation module is configured to determine a target force for the servo operation, to be provided by the adjustment drive, on the basis of the load acting on the interior assembly, as it is calculated by the load calculation module and supplied to the actuation module, and additionally on the basis of a target force value to be applied by a user. The target force value corresponds to the desired force that a user has to apply when adjusting the interior assembly. The target value for the current regulation is intended to be specified by the actuation module such that the adjustment drive provides a force which supports the user when adjusting the interior assembly in such a way that the user has to apply at least approximately only a user force corresponding to the target force value.

In one embodiment, the actuation module then determines the target value on the basis of the target force, and supplies said target value to the current regulation module. In the current regulation module, current regulation takes place on the basis of the target value provided by the actuation module.

In one embodiment, the current regulation module is configured to set the current of the adjustment drive using pulse-width modulation. In the current regulation module, current regulation takes place on the basis of the target value, dependent on the operating mode, which is supplied in each case. The current regulation module outputs a control variable, on the basis of which the voltage fed by the adjustment drive is set with a high-frequency pulse-width modulation, for example with a frequency between 5 kHz and 100 kHz, or even thereabove.

Alternatively, the current can also be set using a linear regulator.

In the current regulation module, regulation takes place on the basis of the target value which is supplied in each case, and the resulting, actual motor current. The current of the adjustment drive is thus set by regulation in such a way that it corresponds to the target value.

An adjustment of one or more adjustment planes of one or more interior assemblies can take place simultaneously. For example, a self-locking can be released and an adjustment process introduced simultaneously, on a vehicle seat, for one or more drive apparatuses, in order to for example simultaneously—in one movement sequence—longitudinally displace and rotate the vehicle seat. This enables comfortable, quick, intuitive adjustment of interior assemblies by a user.

The adjustment drive of the drive apparatus can for example be a brushless direct current motor (BLDC motor). In principle, however, other motors can also be used.

Different applications for a drive apparatus of the type described are conceivable and possible.

In one application, the interior assembly can be implemented by a vehicle seat for example. In this case, the drive apparatus can in particular be configured for adjusting a backrest of the vehicle seat relative to a seat part of the vehicle seat. Alternatively, the drive apparatus can be configured for seat longitudinal adjustment. Alternatively again, the drive apparatus can be configured for seat height adjustment.

In another application, the interior assembly can for example be implemented by a console element, for example a central console, an armrest, a table, or another assembly in the vehicle interior.

In one application, the interior assembly is implemented by a vehicle seat and can be moved, within the context of what is known as an "easy-entry function" into an "easy-entry position", in which the vehicle seat is on the one hand folded with a backrest forwards, and on the other hand pushed entirely into a forward position, such that a space behind the vehicle seat is released, in particular for easier access to a seat row located behind the vehicle seat. In this case, the vehicle seat can for example comprise two drive apparatuses each having an electromotive adjustment drive and an adjustment kinematic mechanism, via which on the one hand the vehicle seat is displaceable longitudinally in the vehicle, and on the other hand the backrest of the vehicle seat is pivotable relative to a set part of the vehicle seat. On one or on both drive apparatuses, an adjustment mode can be activated, depending on at least one trigger criterion, in order to transfer the vehicle seat into the easy-entry position or to bring it back out of the easy-entry position into a normal use position.

Within the context of such an application, an easy-entry function can for example be activated when a pivot movement on the backrest part of the vehicle seat, or a longitudinal movement on the vehicle seat, is identified, within the context of the adjustment mode. If the adjustment mode is for example implemented on the drive apparatus for adjusting the backrest part relative to the seat part, the adjustment mode is activated depending on at least one trigger criterion, and when the adjustment mode is activated a support current is provided, via which the self-locking on the adjustment kinematic mechanism of the drive apparatus is overcome and the backrest part can thus be moved manually by a user. Such a movement can be identified, in order to then start an easy-entry adjustment depending on the movement identification, in the context of which adjustment the vehicle seat is brought into a defined easy-entry position. The adjustment mode of the drive apparatus thus serves for initially identifying a movement on the vehicle seat. If a movement is identified, a further adjustment takes place automatically and electromotively, into the end position that corresponds to the easy-entry position, by means of one or more electromotive drive apparatuses of the vehicle seat.

For example, a user who is sitting on a vehicle seat behind a vehicle seat located in front, and who wishes to get out of the vehicle, can push on the backrest of the vehicle seat located in front. If the drive apparatus of said vehicle seat, associated with the adjustment of the backrest, is in the adjustment mode, then the backrest can be moved manually, wherein the movement is identified and then leads to an automatic adjustment of the entire vehicle seat into the easy-entry position, and thus the backrest part is pivoted, relative to the seat part, into a position folded forwards, and the vehicle seat as a whole is adjusted into a position in which it is pushed forward.

If, in contrast, a user wishes to access a seat row behind a vehicle seat located in front, from outside the vehicle, and, when the vehicle door is open, pulls or pushes for this purpose on the backrest part of the vehicle seat, then the backrest part is caused to move manually, in the context of the adjustment mode. The movement can be identified, and in turn leads to an automatic adjustment of the entire vehicle seat into the easy-entry position.

As a trigger criterion for starting the adjustment mode on one or on a plurality of drive apparatuses of the vehicle seat, within the context of an easy-entry function, in particular on a drive apparatus for adjusting the backrest part of the vehicle seat and on a drive apparatus for longitudinal adjustment of the vehicle seat, it is possible to take into account, for example, whether the vehicle is in a stationary position. Additionally or alternatively, it is possible to take into account whether the vehicle seat to be adjusted is unoccupied. Additionally or alternatively again, it is possible to take into account whether a vehicle door is open. If a trigger criterion or a predetermined combination of trigger criteria is present, the adjustment mode can be started on one or on a plurality of drive apparatuses of the vehicle seat, within the context of the easy-entry function, such that one or more assemblies of the vehicle seat can be moved manually by the user, in the context of the adjustment mode of the respective drive apparatus, and a movement can be identified, in order to automatically and electromotively bring the vehicle seat into a defined end position, after identification of the movement, within the context of the easy-entry function, which end position corresponds to the easy-entry position.

Exception criteria for the adjustment mode can also be defined in this connection. If for example the vehicle seat which is intended to be adjusted in the context of the easy-entry function is occupied, then the adjustment mode can be prevented and thus not started even if one or more trigger criteria are present.

In another application, an adjustment mode, for example for longitudinal adjustment, can be started on a plurality of, preferably all, the vehicle seats of a vehicle. Each vehicle seat comprises a drive apparatus for example, for longitudinal adjustment, which can implement the adjustment mode of the type described. If it is identified, for example, that the vehicle is stationary, and furthermore all the vehicle doors are open, then it can be concluded, for example, that the vehicle interior is intended to be cleaned. It is thus possible to take into account, as a trigger criterion, the fact that the vehicle is stationary and all the vehicle doors are open, in order to then start the adjustment mode on the drive apparatuses of the vehicle seats in each case, and thus enable a manual adjustment of the vehicle seats, such that the positions of the vehicle seats in the vehicle interior can be adapted easily, and manually, by a user.

Starting the adjustment mode on a vehicle seat makes it possible, for example, to also facilitate an installation of an assembly on a seat row located behind the vehicle seat. If it is identified for example, as a trigger criterion, that the vehicle is stationary and one vehicle door is open, then the adjustment mode can be started on the drive apparatus associated with the longitudinal adjustment of the vehicle seat, such that the vehicle seat can be displaced manually, and thus a space behind the vehicle seat can be enlarged or adapted in another manner, in order to install an assembly, for example a child seat, on the seat row located behind the vehicle seat.

In another application, an adjustment of a rear seat row, for example individual vehicle seats of a rear seat row, can be made possible in that the adjustment mode is started on one or more drive apparatuses associated with the rear seat row as a whole or individual vehicle seats of the rear set row, when it is identified for example, as a trigger criterion, that the vehicle is stationary and the tailgate is open. Additionally or alternatively, it can be identified, for example via an interior monitoring system, that a user is attempting to load the vehicle via the load compartment opening when the tailgate is open. In this case, starting the adjustment mode on one or on a plurality of drive apparatuses can enable an adjustment of the rear seat row as a whole or individual vehicle seats of the rear seat row. As a result, a user can for example press from behind on a backrest part of the rear seat row, and thus manually pivot the backrest part, in the context of the adjustment mode, for example by pressure via a load object, for example a roof batten or the like. Additionally or alternatively, a displacement of the rear seat row as a whole or of a vehicle seat of the rear seat row can be made possible, in the context of the adjustment mode.

Whether, in the context of the adjustment mode, the rear seat row as whole or one vehicle seat of the rear seat row is displaced, or a backrest part is pivoted, can for example be made dependent on the point of the rear seat row or a vehicle seat of the rear seat row at which a force action occurs. If a manual force acts (primarily) as the torque for pivoting a backrest part, then, in the context of the adjustment mode, the backrest part can be pivoted manually by the drive apparatus for pivoting the backrest part. If the force action acts (primarily) linearly in the direction of a displacement of the vehicle seat, then, in the context of the adjustment mode, the seat can be displaced manually by the drive apparatus for displacing the vehicle seat.

The adjustment mode can for example in each case be started for a limited time, when a trigger criterion or a combination of a plurality of trigger criteria is present. If no adjustment on the interior assembly is identified within this limited time, then the adjustment mode is stopped again.

The control device for controlling the adjustment mode can be implemented for example by a seat controller or a central controller in the vehicle. A control device of this kind can for example communicate with a local control unit of a respective drive apparatus via a bus system, for example a LIN bus or a CAN bus.

Control tasks can also be assumed in a distributed manner, for example. For example, the presence of trigger criteria can be checked by a superordinate controller, and the adjustment mode can be started accordingly. In contrast, a calibration of the support current can be carried out for example by a local control unit of a drive apparatus.

The support current can be calibrated once, before start-up, or repeatedly during operation. For example, the support current can be calibrated and individually set upon each start of the adjustment mode, such that ageing phenomena or changes in the environmental conditions, for example a current position of the vehicle, can be taken into account when determining the support current.

It is also possible, in this case, to set the support current on the basis of an automatic electromotive adjustment of the interior assembly, for example to a predetermined percentage of a measured current during an electromotive adjustment.

If the adjustment mode is performed on one or on a plurality of drive apparatuses, in the context of an easy-entry function, then the adjustment mode, when the vehicle seat is in a normal use position, is preferably made available only in the direction of the easy-entry position. In contrast, if the vehicle seat is in the easy-entry position, the adjustment mode for initiating the adjustment is preferably made available only in the direction of the normal use position. If the vehicle seat is in a middle position between the normal use position and the easy-entry position, the adjustment mode can enable an adjustment in both directions, i.e. in the direction of the easy-entry position or in the direction of the normal use position, wherein for this purpose, when the adjustment mode is initiated on the adjustment drive, for example a support current is provided alternately in one and in the other movement direction.

Support current values for enabling an adjustment in opposite movement directions can be set equally or can be set independently of one another. For example, the support current values for adjustment in different movement directions can in each case be set as parametric factors. In one embodiment, the support current values are calibrated independently of one another, wherein the calibration can take place once before start-up or repeatedly during operation, for example before each direction change.

According to a further aspect, a method for controlling a drive apparatus for adjusting an interior assembly of a vehicle comprises at least: controlling, by means of a control device, an electromotive adjustment drive of the drive apparatus for producing an adjustment force, wherein a self-locking adjustment kinematic mechanism, driveable by the adjustment drive, is configured for transmitting an adjustment force, produced by the adjustment drive, to the interior assembly; activating, by means of the control device, an adjustment mode for adjusting the interior assembly depending on at least one trigger criterion; and actuating, when the adjustment mode is activated and by means of the control device, the adjustment drive with a support current of a magnitude such that the interior assembly can be put into motion by a user force generated on the interior assembly manually by a user and overcoming the self-locking of the adjustment kinematic mechanism.

The advantages and advantageous embodiments described above for the drive apparatus are applicable analogously to the method.

According to a further aspect, a computer program product comprises commands which, when the program is executed by a computer, cause said computer to carry out the method specified above.

BRIEF DESCRIPTION OF THE DRAWINGS

The concept on which the solution is based will be explained in greater detail in the following with reference to the embodiments shown in the drawings.

DETAILED DESCRIPTION

Figure 1:
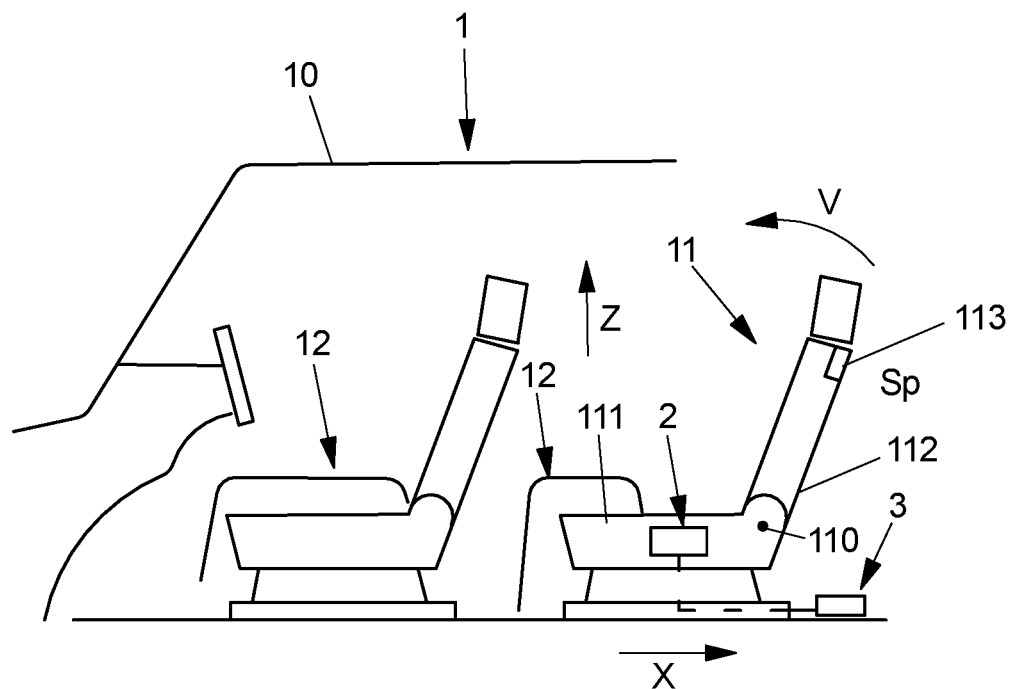
FIG. 1 is a schematic view of a vehicle comprising interior assemblies in the form of vehicle seats.

FIG. 1 is a schematic view of a vehicle 1 which forms an interior enclosed by a vehicle body 10, in which interior various interior assemblies, for example in the form of vehicle seats 11 and console elements 12, and in addition optionally further interior assemblies such as monitors, partition walls, rests, storage compartments, or the like are arranged.

Within the context of novel interior concepts, for example in connection with self-driving vehicles, interior assemblies 11, 12 can be adjustable in a variable manner in the interior of a vehicle 1.

Figure 2:
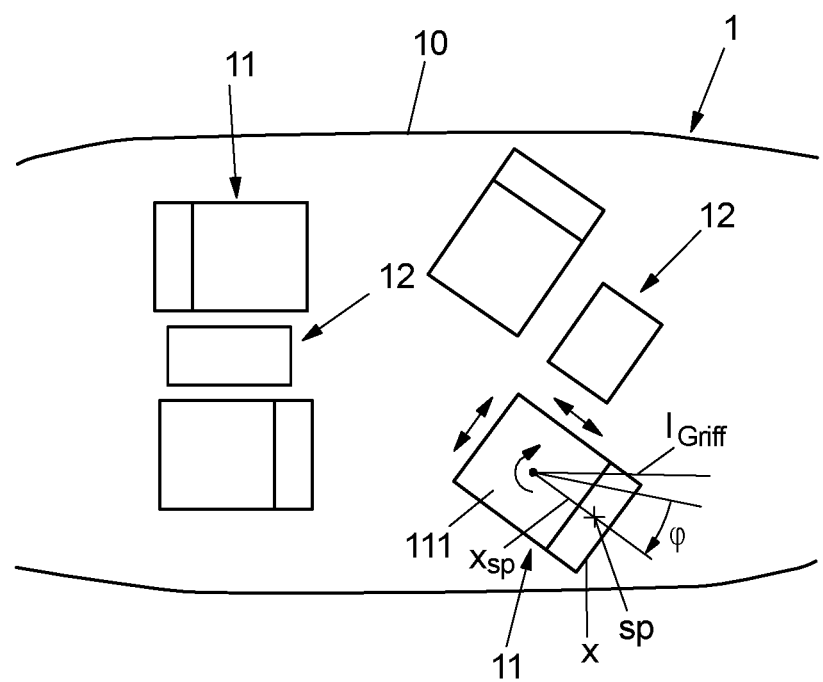
FIG. 2 is a schematic plan view of a vehicle.

For example, an interior assembly 11 in the form of a vehicle seat can be adjustable in a variable manner, in order to adjust the vehicle seat along an adjustment plane defined by a vehicle longitudinal direction X and a vehicle transverse direction Y, and furthermore optionally to twist it about a vertical direction Z, as is visible from FIG. 1 in overview with FIG. 2. Furthermore, assemblies of the vehicle seat, for example the backrest 112, may be adjustable in order to adapt the position of the respective assembly. For example, the tilt of the backrest 112 can be adjustable. Furthermore, it can be possible to set the height position and also the tilt position of the seat part 111.

In the case of an interior assembly 11, 12, there is in principle a desire for adjustment by a user that is comfortable, intuitive, and pleasant to the touch. In this case, the adjustment should, as far as possible, be able to take place precisely and quickly, wherein the force application required for this should be limited by a user.

For adjusting an interior assembly 11, 12, as shown schematically in FIG. 1, a drive apparatus 2 is provided, which is connected to a control device 3. The drive apparatus 2 is configured electromotively and can be operated so as to move an associated interior assembly 11, 12 electromotively between different positions.

In principle, each interior assembly 11, 12 to be adjusted, or a subassembly, to be adjusted, of an interior assembly 11, 12, for example the backrest 112 of a vehicle seat, can be associated with its own electromotive drive apparatus 2, wherein the drive apparatuses 2 can for example be connected to a common control device 3 such that the control device 3 controls the drive apparatuses 2 together for adjusting the associated interior assembly 11, 12.

Using the drive apparatus 2 makes it possible for an associated interior assembly 11, 12 to be adjustable along a defined movement path. For example, a vehicle seat can be intended to be displaced longitudinally along the vehicle longitudinal direction X, along a movement path defined by guide rails, relative to a vehicle floor. A backrest part 112 can furthermore be intended to be pivoted about a defined pivot axis 110, relative to the seat part 111.

However, it is also conceivable that an interior assembly 11, 12 is intended to be moved freely along a vehicle floor of the vehicle 1, and thus can be freely adjusted in the interior and for example locked at defined anchor points in the interior. In this respect, for example guide rails for defining a fixed, predetermined movement path do not necessarily have to be provided.

A (or each) drive apparatus 2 can for example be operated in automatic operation and servo operation, and can thus bring about an automatic adjustment of the interior assembly 11, 12 associated in each case, or a manual adjustment, but which is supported electromotively by the drive apparatus 2, of the interior assembly 11, 12 by a user. For this purpose, the drive apparatus 2 can for example be switchable between different operating modes, wherein the adjustment drive 20 is controlled differently depending on the operating mode set in each case.

While in automatic operation a regulation for example to a predetermined speed is intended to take place, in order to move the interior assembly 11, 12 at a predetermined adjustment speed between different positions, in servo operation a force is intended to be provided by the adjustment drive 20, which force causes a user force, to be additionally applied by a user, to bring about an adjustment of the interior assembly 11, 12. In this case, the user force to be applied by the user is intended to be preferably at least approximately the same over the adjustment path of the interior assembly 11, 12, or to follow a desired curve, in order to enable the user a comfortable adjustment that is pleasant to the touch.

Figure 3A:
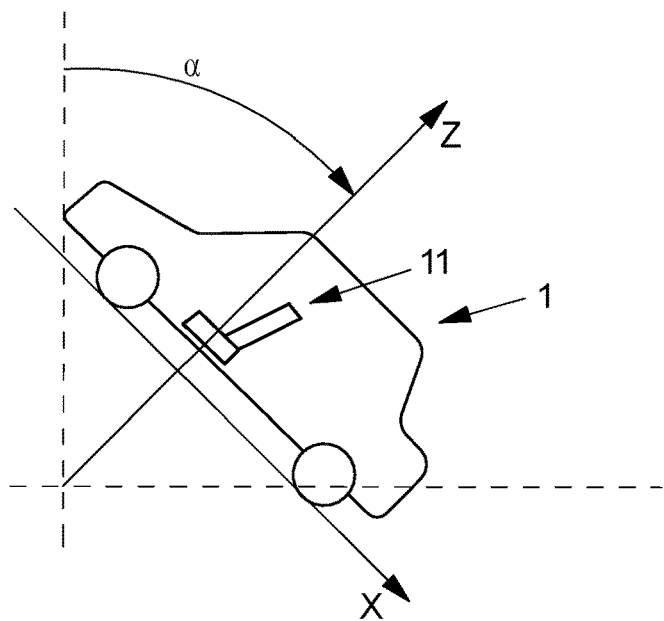
FIG. 3A is a view for illustrating a pitch angle of a vehicle.
Figure 3B:
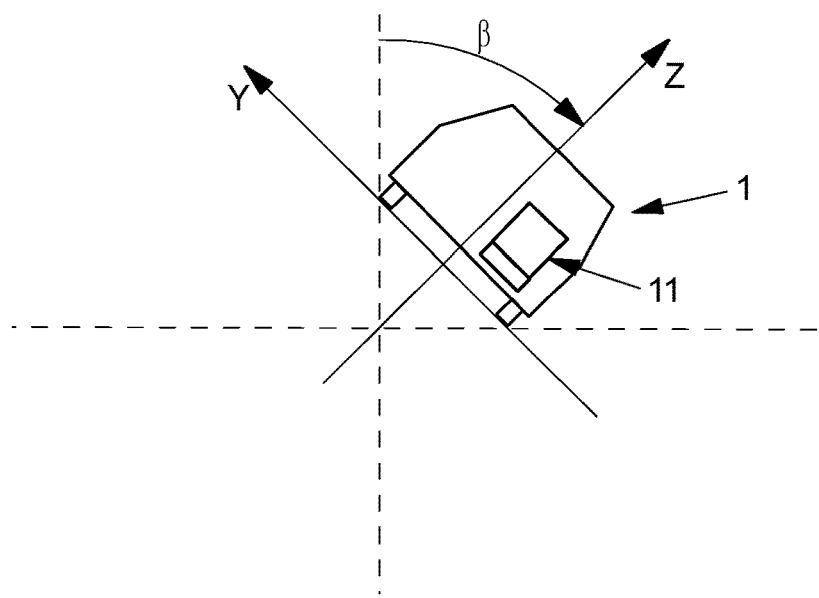
FIG. 3B is a view for illustrating a tilt angle of a vehicle.

FIGS. 3A and 3B show (in drawings shown exaggerated for illustration) different vehicle positions and resulting positions of an interior assembly 11 in the form of a vehicle seat in the interior of the vehicle 1.

In this case, FIG. 3A shows a vehicle 1, which is for example parked on a slope having a gradient, and accordingly a pitch angle α between the vehicle vertical axis Z and a vertical (determined by the direction of gravity). The pitch angle α of the vehicle 1 is measured about the vehicle transverse axis Y (see FIG. 2B).

In contrast, FIG. 3B shows a vehicle 1 which is inclined about the vehicle longitudinal axis X (see FIG. 3A). In this case, the vehicle vertical axis Z have a tilt angle β relative to the vertical, measured about the vehicle longitudinal axis X.

As will be explained in the following, the vehicle position is included in the calculation of the force to be provided by the adjustment drive 20 in servo operation mode, which force is intended to assist a user when adjusting the interior assembly 11, 12.

Figure 4:
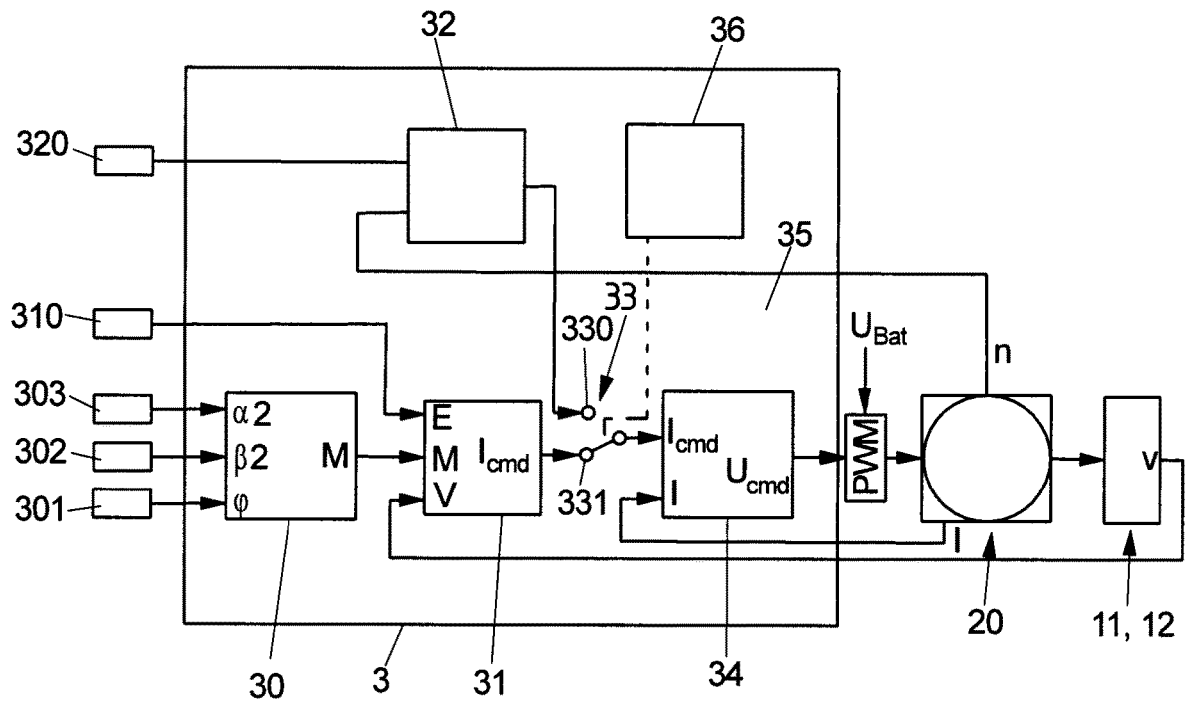
FIG. 4 is a functional view of a control device of a drive apparatus.

A control device 3, shown in an embodiment in FIGS. 4, for controlling the adjustment drive 20 of the drive apparatus 2 comprises various regulation modules, which serve, depending on the operating mode, for setting a current (corresponding to the motor current) of the adjustment drive 20 configured as an electric motor, in such a way that an adjustment of an interior assembly 11, 12 takes place in a desired manner, depending on the operating mode, specifically in automatic operation at a desired adjustment speed, and in servo operation in a force-assisted manner.

The control device 3 constitutes a current regulation module 34, to which a target value $I_{cmd}$ is fed, wherein, depending on the operating mode, the current regulation module 34 receives the target value $I_{cmd}$ from a speed regulation module 32 or an actuation module 31.

In this case, the speed regulation module 32 serves to specify the target value $I_{cmd}$, in automatic operation, in such a way that a desired speed results on the adjustment drive 20, and correspondingly a desired adjustment speed v results on the interior assembly 11, 12.

In contrast, the actuation module 31 serves to specify the target value $I_{cmd}$ in such a way that a manual adjustment of the interior assembly 11, 12 is supported, in servo operation, by a force which is set such that the force to be additionally applied by a user is preferably at least approximately the same over the adjustment path of the interior assembly 11, 12, or follows a desired curve.

The speed regulation module 32 regulates the speed of the adjustment drive 20, in automatic operation. In this case, a target speed $n_{cmd}$ is fed to the speed regulation module 32 via in input 320, wherein the target speed $n_{cmd}$ is for example stored in a memory and thus fixed (as a constant value or as a speed curve over the adjustment path), but can optionally also be adapted by a user. Depending on the target speed $n_{cmd}$ and the speed actually resulting at the adjustment drive 20 in regulation operation, the speed regulation module 32 determines a target value $I_{cmd}$, which it feeds to the current regulation module 34.

In automatic operation, the speed regulation module 32 is connected to the current regulation module 34 via a switching device 33, in that the switching device 33 is switched to a switching point 330. The target value $I_{cmd}$ output by the speed regulation module 32 is thus fed to the current regulation module 34, such that the current regulation module 34 can perform current regulation on the basis of the target value $I_{cmd}$ obtained from the speed regulation module 32.

The switching device 33 can be implemented physically by a mechanical switch. Advantageously, however, the switching device 33 is implemented in terms of software technology, by the software of the control device 3. Likewise, the modules of the control device 3 are preferably implemented by software modules.

The control of the switching device 33 takes place for example via a control module 36 of the control device 3.

Current regulation takes place in the current regulation module 34. The current regulation module 34 regulates the current of the adjustment drive 20 in such a way that it is set to the target value fed to the current regulation module 34.

The current regulation module 34 sets the current using a voltage control value $U_{cmd}$ in the form of a load factor (between 0% and 100%), in that the voltage control value $U_{cmd}$ is fed to a pulse-width modulation 35, which produces an output voltage on the basis of the battery voltage $U_{Bat}$ of the vehicle and the voltage control value $U_{cmd}$, and feeds said output voltage to the adjustment drive 20. The pulse-width modulation 35 preferably operates at a comparatively high frequency, in particular is operated at a frequency between 5 kHz and 30 kHz, for example 20 kHz. On the basis of the target value $I_{cmd}$ and the actually resulting current I of the actuating drive 21, the control value $U_{cmd}$ is set such that the motor current I is regulated to the target value $I_{cmd}$.

Thus, in automatic operation, a regulation takes place in the manner of a cascade regulation, in which the speed regulation module 32 determines a control value in the form of a target value $I_{cmd}$, and feeds this to the downstream current regulation module 34 for current regulation.

Switching the switching device 33 to the switching point 331 makes it possible to switch into a servo operation, in which a target value $I_{cmd}$ is now fed to the current regulation module 34 from the actuation module 31. On the basis of the target value obtained by the actuation module 31, a current regulation then takes place such that the force provided by the adjustment drive 20 supports a user when adjusting the interior assembly 11, 12, and the user has to apply a user force, for the electromotively supported adjustment of the interior assembly 11, 12, which force is preferably as far as possible uniform over the adjustment path of the interior assembly 11, 12.

The target value $I_{cmd}$ is determined by the actuation module 31 depending on a load acting on the interior assembly 11, 12, which load is calculated by a load calculation module 30 depending on the vehicle position and for example a position of the interior assembly 11, 12.

This can be explained for example on the basis of an adjustment in the form of a rotational movement about the vehicle vertical axis Z, of an interior assembly 11, 12, in the form of a vehicle seat. In the case of a rotational movement of this kind, loads influenced by the vehicle tilt and the vehicle pitch result on the interior assembly 11, 12, which loads are taken into account when determining the target value $I_{cmd}$.

The load acting on the interior assembly 11, 12 is determined essentially from a static load force and a dynamic load force.

For twisting about the vehicle vertical axis Z, a static load torque acting on the interior assembly 11, 12 is determined in particular on the basis of a torque about the vehicle vertical axis Z, resulting on account of gravity, and in addition on the basis of a frictional torque acting in the bearing of the interior assembly 11. The static torque, referred to as the static load torque, thus results in:

$$M_{stat} = M_{Neigung} * \cos(\alpha) + M_{Steigung} \pm M_R,$$

wherein $M_{stat}$ denotes the static load torque, $M_{Neigung}$ denotes a tilt torque resulting on account of a vehicle tilt, $M_{Steigung}$ denotes a pitch torque resulting on account of a vehicle pitch, and $M_F$ denotes a frictional torque in the bearing of the interior assembly 11, 12.

It should be noted here that the term "$\cos(\alpha)$" in the above equation is present only when the tilt/pitch angles are determined according to DIN ISO 8855 (corresponding to the Euler angle, which results from a roll angle, pitch angle and yaw angle). If the tilt angle is measured (in absolute terms), then the term "$\cos(\alpha)$" is omitted.

In this case, the pitch torque and the tilt torque are calculated as follows:

$$M_{Steigung} = x_{SP} * m * g * \sin(\alpha) * \sin(\varphi)$$

$$M_{Neigung} = x_{SP} * m * g * \sin(\beta) * \cos(\varphi)$$

In this case, the variables used in these equations represent:

$\varphi$ Current angle of rotation [°]—Offset angle
$x_{SP}$ Axis of rotation—Centre of gravity spacing [m]
m Mass of the interior assembly [kg]
g Acceleration due to gravity [m/s²]
$\alpha$ Axis of rotation pitch
$\beta$ Axis of rotation tilt [°]
$M_R$ Frictional torque [Nm]

The angles $\alpha$, $\beta$ are shown in FIGS. 3A and 3B. The distance $x_{SP}$ between the center of gravity SP of the interior assembly 11 and the axis of rotation of the interior assembly 11, 12 is shown by way of example in FIG. 2. The pitch of the vehicle 1 and the tilt of the vehicle 1, as well as the current position of the interior assembly 11, 12, can be detected sensorially by sensors 301, 302, 303, and measured values are fed to the load calculation module 30 in a corresponding manner.

When determining the static load torque it is possible, for example when the interior assembly 11, 12 is formed by a vehicle seat, to also take into account an occupancy by a user or by objects. In this case, in particular the mass of the interior assembly 11, 12, changes. A force acting on account of an occupancy can be determined at least approximately for example on the basis of a sensor signal of a sensor device of the interior assembly 11, 12, and taken into account when calculating the load torque.

In addition to the static load torque, when the interior assembly 11, 12 moves a dynamic load torque also acts, which is calculated as follows:

$$M_{dyn} = \ddot{\varphi} * I * c$$

in this case $\ddot{\varphi}$ denotes the acceleration of the interior assembly 11, 12. The acceleration of the interior assembly 11, 12 can be determined from a change in the adjustment angle $\phi$ about the axis of rotation. Alternatively, the acceleration can, however, also be calculated from the adjustment speed v of the interior assembly 11, 12, which is fed to the actuation module 31 during operation.

In the above equation, I stands for the inertia of the interior assembly 11. The factor c enables setting of a dynamic surface feel and can assume values between 0% and 100%. If c=100%, a dynamics change during acceleration of the interior assembly 11 is substantially compensated by the motor. If c=0%, a user must themselves apply a force change in the case of an acceleration.

In addition to such static and dynamic load forces, a torque results on the interior assembly 11, 12, which is brought about by the user force on the point of application on the interior assembly 11, 12. In this case, the user torque resulting in:

$$M_{user} = F_{user} * l_{Griff}$$

where $F_{user}$ Desire operating force [N]

$l_{Griff}$ Application position—Axis of rotation spacing [m]

$M_{user}$ Torque generated by the user [Nm]

The distance $l_{Griff}$ between an application position, at which a user engages as intended on an interior assembly 11, 12, and which for example can correspond to the position of an operating element on the interior assembly 11, 12, and the axis of rotation of the interior assembly 11, 12 pointing along the vehicle vertical direction Z is shown schematically in FIG. 2.

On the basis of the static load torque, the dynamic load torque, and the user torque, a force balance in the form of a torque balance can be established, in order to determine a target load torque to be provided by the adjustment drive 20. In this case, the torque balance results as follows:

$$M_{Soll} = M_{stat} + M_{dyn} - M_{user}$$

$M_{soll}$ denotes the torque to be provided at the rotational axis by the drive apparatus 2. From this, the actuation module 31 calculates the torque to be provided by the adjustment drive 20, taking into account a gear ratio of the drive apparatus 2, resulting in:

$$M_{Soll\_Antrieb} = M_{Soll} * \ddot{u}_{Hebel}$$

$\ddot{u}_{Hebel}$ denotes the gear ratio of the kinematics of the drive apparatus 2 for transmission of an adjustment force provided by the drive apparatus 2 at the location of an electromotive adjustment drive into an adjustment force at the location of the axis of rotation of the interior assembly 11, 12. $\ddot{u}_{Hebel}$ can be dependent for example on φ and be stored for example in the form of a look-up table in the system.

The target torque of the electromotive adjustment drive is calculated from the target torque of the drive, taking into account the motor efficiency and a gear ratio of a motor transmission, resulting in:

$$M_{Soll\_motor} = \frac{M_{Soll\_Antrieb}}{\eta_{motor} * \ddot{u}_{Transmission}}$$

where $\eta_{motor}$ Gear ratio efficiency [ ]

$\ddot{u}_{Transmission}$ Gearing [ ]

The motor current is essentially proportional to the motor torque, such that the target value can be calculated, from the target motor torque $M_{Soll\_motor}$, as follows:

$$I_{Soll\_motor} = \frac{M_{Soll\_motor}}{Kt} + I_o$$

where

Kt Motor constant [Nm/A]

$I_o$ Motor idling current [A]

This value is fed from the actuation module 31 to the current regulation module 34, in servo operation mode, as the target value $I_{cmd}$.

For another adjustment, for example for a longitudinal and/or transverse adjustment of an interior assembly 11, 12 along a vehicle floor, i.e. along an adjustment plane spanned by the vehicle longitudinal direction X and the vehicle transverse direction Y, a similar equation system results, in which the load on the interior assembly 11, 12 is dependent on the tilt and pitch of the vehicle 1, as shown in FIGS. 3A and 3B.

Figure 5:
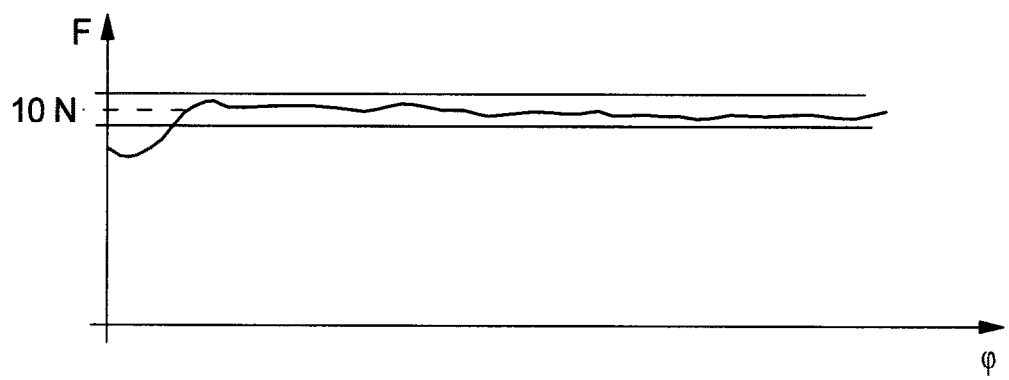
FIG. 5 is a graph showing an adjustment force, to be applied by a user, over an adjustment of an interior assembly in a servo operation mode.

In servo operation mode, the target value $I_{cmd}$ is thus determined, using load forces acting on the interior assembly 11, 12, in such a way that a force to be applied by the user is the same over the adjustment path of the interior assembly 11, or follows a desired curve. Correspondingly, for example, as shown in FIG. 5, a user force F results which is at least approximately uniform over an adjustment path of the interior assembly 11, 12 (denoted in FIG. 5 by an adjustment angle φ) and which can be set to a predetermined value for example to 10 N. A user thus has to apply a regulated, uniform user force of for example 10 N over the adjustment path of the interior assembly 11, 12, in order to bring about an easy, electromotively supported adjustment of the interior assembly 11, 12.

Figure 6:
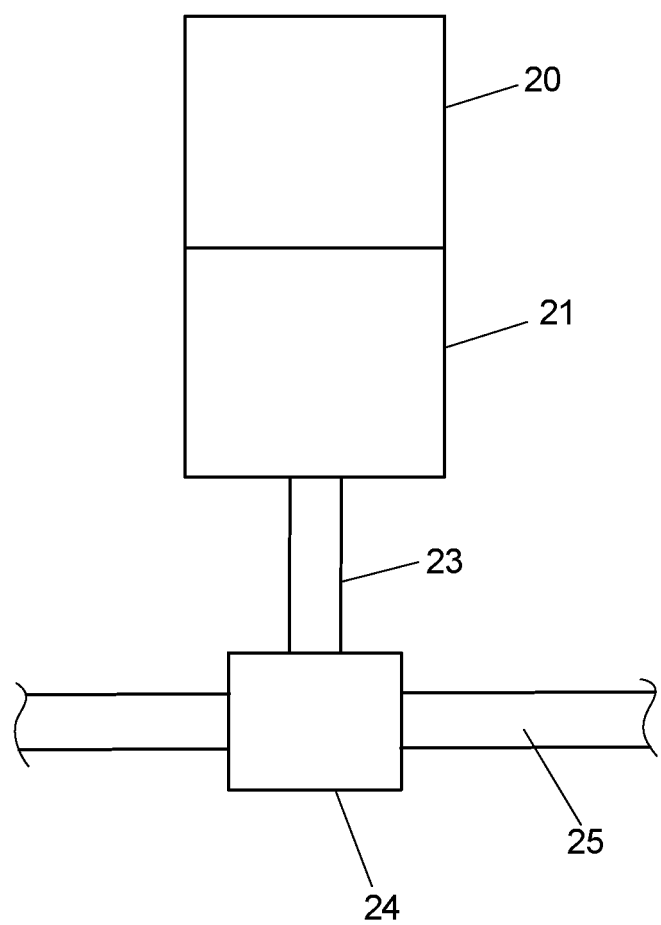
FIG. 6 is a schematic view of a drive apparatus for adjusting an interior assembly, for example a vehicle seat.

FIG. 6 is a schematic view of an embodiment of a drive apparatus 2 which is configured for electromotively adjusting an associated interior assembly 11, 12. In a servo operation, the drive apparatus 2 can enable a manual but electromotively supported adjustment of the associated interior assembly 11, 12, and in an automatic operation said drive apparatus can enable an automatic adjustment for example between defined adjustment positions.

The drive apparatus 2 comprises an electromotive adjustment drive 20 in the form of an electric motor, which is operatively connected to a transmission 21. The transmission 21 serves for driving an output element 23 which acts on a transmission element 24 and, thereby, on an adjustment assembly 25 for adjusting the associated interior assembly 11, 12. The transmission 21, together with the output element 23, the transmission element 24 and the adjustment assembly 25, forms an adjustment kinematic mechanism for transmitting an adjustment force from the adjustment drive 20 to the associated interior assembly 11, 12.

For example, the output element 23 can be formed by a drive worm having a worm gearing formed thereon, which is engaged with a transmission element 24 in the form of a spindle nut. The spindle nut 24 can for example be arranged on an adjustment assembly 25 in the form of a spindle, such that driving the spindle nut 24 brings about a longitudinal adjustment between the spindle nut 24 and the spindle 25, and thus an associated interior assembly 11, 12 can be adjusted longitudinally. An adjustment kinematic mechanism of this kind can be implemented for example in the case of a longitudinal adjustment device of an interior assembly 11, 12, for example in the form of a vehicle seat.

The adjustment drive 20 comprising the transmission 21 and the adjustment kinematic mechanism provided by the output element 23, the transmission element 24 and the adjustment assembly 25 is configured to be self-locking. Thus, if the adjustment drive 20 is not energized, the respectively associated interior assembly 11, 12 is held in position by the adjustment kinematic mechanism.

The adjustment of the interior assembly 11, 12 is intended to be able to be performed by a user in a comfortable manner, in that a user acts on the interior assembly 11, 12 to be adjusted, and initiates an adjustment movement by means of manual action of force. While in the case of a non-energized adjustment drive 20 a manual adjustment of the interior assembly 11, 12 is excluded, on account of the self-locking of the adjustment kinematic mechanism, and an adjustment force introduced into the interior assembly 11, 12 on the output side is blocked by the adjustment kinematic mechanism, in the present case it is provided that the self-locking is overcome by energization of the adjustment drive, and thus a manual adjustment of the interior assembly 11, 12 is made possible.

In particular, the control device 3 is configured to activate an adjustment mode for adjustment of the interior assembly 11, 12 and, when the adjustment mode is activated, to actuate the adjustment drive 20 with a support current. In this case, the support current is of a magnitude such that the self-locking of the adjustment kinematic mechanism is removed such that when a user acts on the interior assembly 11, 12, this can be moved manually.

In this case, in order to reduce the requirements for a sensor system for identifying an adjustment wish, it is provided that the adjustment mode for adjustment of the interior assembly 11, 12 is activated depending on one or more trigger criteria.

Trigger criteria of this kind can for example be the occupancy or movement state of an interior assembly 11, 12, for example a vehicle seat, an opening state of a vehicle door, in particular a vehicle side door or a tailgate, or a travel state of the vehicle.

Such trigger criteria can be assessed as positive criteria, and result in the adjustment mode being activated. However, such trigger criteria can also be assessed as negative criteria (exclusion criteria) and result in the adjustment mode not being able to be started if a negative criterion of this kind does not exist.

As a positive criterion, for example the opening state of a vehicle door can be called up. Thus, for example the adjustment mode can be activated if a vehicle side door or the tailgate is opened, wherein in this case the adjustment mode is activated for example for an interior assembly 11, 12 in the region of the open vehicle side door or the tailgate.

As a negative criterion, for example the occupancy state or a travel state of the vehicle can be called up. Thus, an activation of the adjustment mode can for example be possible only if an interior assembly 11, 12 in the form of a vehicle seat is not occupied, or if the vehicle is not travelling, i.e. is at a standstill.

If the adjustment mode is activated when a trigger criterion is present or when a predetermined combination of trigger criteria is present, then the adjustment drive 20 is initially energized using a low-energy, advantageously pulse-width modulated, support current. In this case, the support current is of a magnitude such that the self-locking of the transmission 21 and the kinematic mechanism, coupled thereto, is removed, but the interior assembly 11, 12 is not caused to move, or, alternatively, slowly begins to move.

If a movement of the interior assembly 11, 12 is then identified, for example on the basis of a movement identification using Hall sensors on the interior assembly 11, 12, then an adjustment wish of a user is concluded and for example the servo operation is started, in which a further adjustment of the interior assembly 11, 12 is supported electromotively by the adjustment drive 20 in the servo operation.

The energization upon activation of the adjustment mode can take place in a low-energy manner, in such a way that the interior assembly 11, 12 initially does not move. The energization is therefore such that an adjustment force is introduced into the transmission, and thereby into the interior assembly 11, 12, which force overcomes the self-locking, such that the interior assembly 11, 12 can be caused to move by a user force introduced into the interior assembly 11, 12 on the output side. However, the energization with the low-energy support current does not yet itself lead to a movement on the interior assembly 11, 12.

Alternatively, the energization can take place in such a way that the interior assembly 11, 12 is caused to move slowly, when the adjustment mode is activated, wherein the movement speed is less than a limit speed which is for example in a range between $\frac{1}{10000}$ m/s and $\frac{1}{100}$ m/s. The interior assembly 11, 12 begins to move slowly, upon energization with the low-energy support current when the adjustment mode is activated, such that a user is made aware of the activation of the adjustment mode.

If the energization with the support current takes place in a movement direction, then the self-locking is also released only in this one movement direction. In order to enable a manual adjustment in different movement directions, the adjustment drive 20 can be energized in an alternating manner, wherein the support current can be of the same magnitude in both movement directions or can be different depending on the movement direction. The energization can take place in each movement direction over a fixed time period, for example between 0.1 seconds and 1 second, wherein the energization in the different movement directions is alternated.

The value of the low-energy support current upon activation of the adjustment mode can be stored in the system in a hard-programmed and invariable manner. Alternatively, the value of the support current can be calibrated by calibration, wherein the calibration can take place once, before start-up, on the interior assembly 11, 12 associated in each case, or the calibration can take place repeatedly during operation.

The calibration can for example take place such that an energization of the adjustment drive 20 on the interior assembly 11, 12 is increased slowly, wherein the current value from which the adjustment drive 20 begins to move is monitored using Hall sensors of the adjustment drive 20. The support current can then be set to a value which is for example just below a current value at which the adjustment drive 20 begins to move.

An adjustment wish of a user may occur upon activation of the adjustment mode by a movement identification on the interior assembly 11, 12 (for example using a movement sensor on the interior assembly 11, 12), or by movement identification on the adjustment drive 20 (using Hall sensors of the adjustment drive 20).

In this case, an adjustment wish can be identified if a movement on the interior assembly 11, 12 is detected. Alternatively, an adjustment wish in the case of an activated adjustment mode can be identified on the basis of a particular movement pattern on the interior assembly 11, 12. For example, an adjustment wish can be identified if a jolting movement on the interior assembly 11, 12 or an impulse force in the sense of nudging of the interior assembly 11, 12 is detected.

If an adjustment wish is identified in the activated adjustment mode, then for example a switch into servo operation is possible, in order to electromotively support a further, manual adjustment of the interior assembly 11, 12.

Alternatively, the control device 3 can be configured to switch into a nudging operation in the case of an identified adjustment wish, in which operation the interior assembly 11, 12 initially moves, when the adjustment mode is activated, by application of an impulse by a user, and the further movement of the interior assembly 11, 12 then takes place without further user action, for example in that the current of the adjustment drive 20 is regulated for further movement of the interior assembly 11, 12 into a predefined end position.

It should be noted that, in nudging operation, it is also possible to not further control the further movement of the interior assembly 11, 12 after the application of an impulse by a user, but rather to allow the interior assembly 11, 12 to move freely after nudging by the user, until the interior assembly 11, 12 comes to a stop automatically owing to friction in the system. When the adjustment mode is activated and the support current is provided, for removing the self-locking, the further movement thus takes place purely manually, in that a user applies an impulse to the interior assembly 11, 12 and the interior assembly 11, 12 then moves automatically without further control.

The control device 3 can be configured, when the adjustment mode is activated, to produce an indication signal for a user, such that the user is alerted that the adjustment mode has been activated for a particular interior assembly 11, 12. An indication of this kind can take place in that when the adjustment mode is activated the adjustment drive 20 is actuated for a slow movement of the interior assembly 11, 12, which can be perceived by a user. Additionally or alternatively, the control device 3 can output a signal for example to an audio system of the vehicle, which indicates to the user that the adjustment mode is activated. Additionally or alternatively again, the control device 3 can actuate the adjustment drive 20 for example for a predetermined noise generation, for example for playing sounds.

Figure 7A:
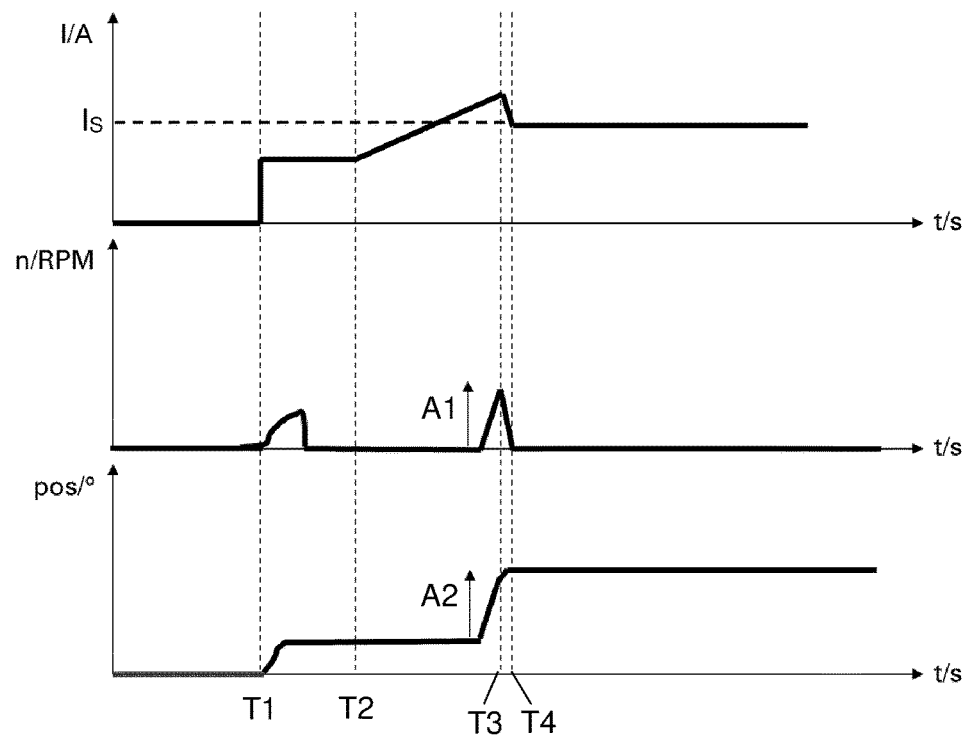
FIGS. 7A, 7B are views for illustrating the calibration of the support current when starting an adjustment mode for adjusting an interior assembly.
Figure 7B:
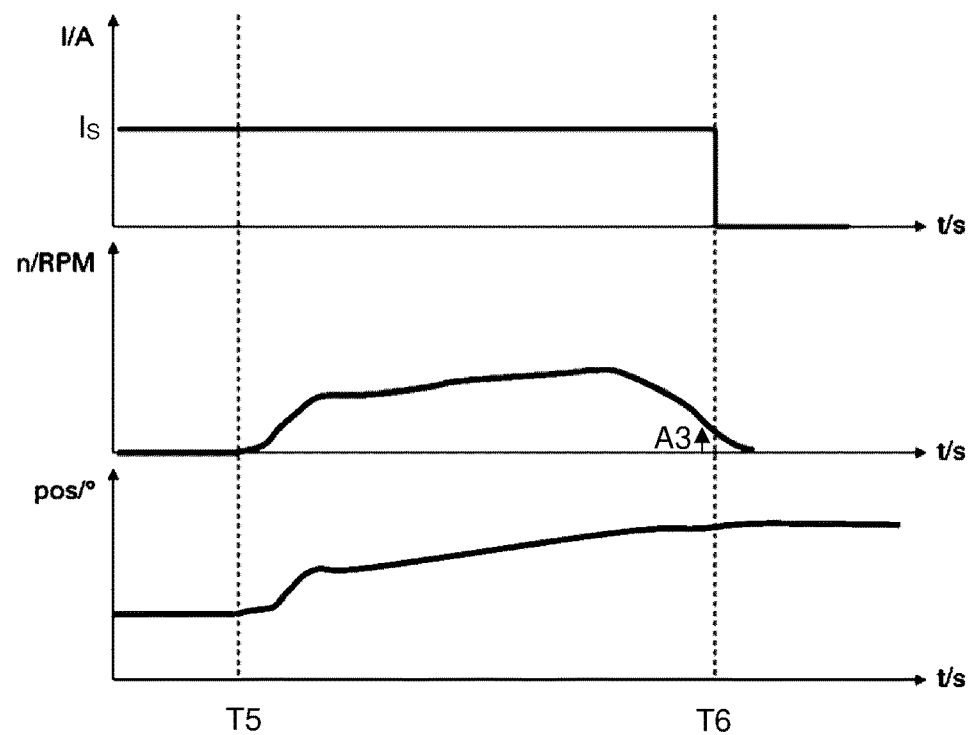

FIGS. 7A and 7B illustrate a possible procedure for determining a support current for starting an adjustment mode on a drive apparatus 2 on an interior assembly 11, for example a vehicle seat. In this case, FIGS. 7A, 7B each show, in the top graph, the motor current I [A] provided at the adjustment drive 20, in the middle graph, the speed n [rpm] of the adjustment drive 20, and in the bottom graph the position pos [°] of the motor shaft over time.

In the progression shown, at the timepoint T1 the adjustment mode of the drive apparatus 2 is started depending on the presence of a trigger criterion or a combination of a plurality of trigger criteria. At the start of the adjustment mode, the support current is individually determined and thus calibrated, such that the support current is set on the basis of the specifically existing conditions, for example a sluggishness in the drive apparatus 2 and a parking position of the vehicle.

After identification of the presence of the required trigger criteria, at the timepoint T1 the adjustment drive 20 is first energized with a constant current in a time period between the timepoints T1, T2. The current is of such a magnitude that play in the system can be compensated, but an adjustment of the associated interior assembly cannot take place. Correspondingly, as can be seen in FIG. 7A on the basis of the course of the speed and the position, a slight position change occurs upon rotation of the motor, which brings about a play compensation in the system.

At the timepoint T2, the play is compensated. The motor current is now increased slowly, until at timepoint T3 a movement of the interior assembly is identified. In this case, a movement is identified if the speed of the adjustment drive 20 reaches a predetermined limit speed A1 (FIG. 7A in the middle graph), and/or the position of the motor shaft has changed by a predetermined path A2 (FIG. 7A in the bottom graph).

It is thus identified, at the timepoint T3, that the interior assembly has moved on account of the energization. The motor current is now reduced between the timepoints T3 and T4, for example on the basis of a predetermined factor, such that the adjustment drive 20 is subsequently energized by a motor current, which itself does not bring about any adjustment of the interior assembly and represents the support current $I_s$.

For example, the support current $I_s$ is set to a value between 50% and 70% of the current value at the timepoint T3, i.e. of the current value at which a movement of the interior assembly, on account of the energization, is identified.

After the timepoint T4, the drive apparatus 2 is ready for operation, in the activated adjustment mode, such that a user can manually adjust the interior assembly. This is shown in FIG. 7B.

At the timepoint T5, for example a force is exerted on the interior assembly by a user, which force leads to an adjustment on the interior assembly. Correspondingly, the speed (FIG. 7B, middle graph) and the position of the motor shaft (FIG. 7B, bottom graph) of the adjustment drive 20 changes. The adjustment of the interior assembly takes place manually, wherein the self-locking in the system is overcome by the support current $I_s$, and thus the adjustment of the interior assembly can be performed easily by a user, for example in that the user nudges or manually guides the interior assembly for applying an impulse.

At the timepoint T6, it is identified that the speed has fallen below a predetermined threshold value A3. At this timepoint T6, the adjustment mode is ended and the support current $I_s$ is thus deactivated, such that the adjustment drive 20 is no longer energized. The drive apparatus 2 thus reaches its self-locking state, in which the self-locking is no longer overcome by the adjustment drive 20 and the system thus acts overall in a self-locking manner, such that a further adjustment by forces introduced on the output side is not possible.

The adjustment mode is thus ended, the interior assembly comes to a standstill, and maintains its position after the timepoint T6.

A determination of the support current $I_s$, as described above, can take place each time the adjustment mode is started. In this case, the determination of the support current can also be performed in the case of a direction change, such that the support current is always newly determined individually and thus changes in the system are taken into account.

It is also conceivable, however, to calibrate the support current just once, for example upon start-up, or at large intervals, for example once a day, once a week, or once a month.

The concept on which the invention is based is not limited to the embodiments set out above, but rather can also be implemented in another manner.

The interior assembly can be implemented by very different assemblies in the interior of a vehicle, and in this respect is not limited to a vehicle seat or a console element. An interior assembly, which can be adjusted by a drive apparatus in a servo operation, can for example also be a monitor, a rest (for example in the form of a table or the like), a partition wall, a storage compartment, or the like.

A control in servo operation is not limited to a current regulation of the type described, but rather can also be configured differently.

LIST OF REFERENCE CHARACTERS 1 motor vehicle
10 vehicle body
11 interior assembly (vehicle seat)
110 pivot axis
111 seat part
112 backrest part
12 interior assembly (console element)
2 drive apparatus
20 adjustment drive (motor)
21 transmission
23 output element
24 transmission element
25 adjustment assembly
3 control device
30 load calculation module
301-303 sensor device
31 actuation module
310 event identification
32 speed regulation module
320 speed input
33 switching device
330, 331 switching point
34 current regulation module
35 PWM unit
36 control module
α pitch angle of the vehicle vertical axis
β tilt angle of the vehicle vertical axis
φ angle
A1-A3 threshold value
$I_{cmd}$ target value
$I_s$ support current
n speed
SP center of gravity
T1-T6 timepoint
$U_{Bat}$ battery voltage
$x_{SP}$ axis of rotation—center of gravity spacing
V pivot direction
X vehicle longitudinal axis
Y vehicle transverse axis
Z vehicle vertical axis

The invention claimed is:

1. A drive apparatus for adjusting an interior assembly of a vehicle, comprising:
an electromotive adjustment drive for generating an adjustment force,
a self-locking adjustment kinematic mechanism for transmitting an adjustment force generated by the adjustment drive to the interior assembly, which adjustment kinematic mechanism can be driven by means of the adjustment drive, and
a control device for controlling the adjustment drive,
wherein the control device is configured to activate an adjustment mode for adjustment of the interior assembly depending on at least one trigger criterion and, when the adjustment mode is activated, to actuate the adjustment drive with a support current of a magnitude such that the interior assembly can be put into motion by means of a user force generated manually on the interior assembly by a user and overcoming the self-locking of the adjustment kinematic mechanism,
wherein the control device comprises a current regulation module for regulating a current of the adjustment drive,
wherein the control device comprises an actuation module for determining a target value depending on a load acting on the interior assembly, wherein the current regulation module is configured to regulate the current of the adjustment drive on the basis of the target value supplied by the actuation module, and
wherein the actuation module is configured to determine a target force, to be provided by the adjustment drive, on the basis of a load acting on the interior assembly and a target force value.

2. The drive apparatus according to claim 1, wherein the support current is of such a magnitude that an adjustment force brought about by the support current does not move the interior assembly or moves it at a movement speed that is below a limit speed.

3. The drive apparatus according to either claim 1, wherein the support current is pulse-width modulated.

4. The drive apparatus according claim 1, wherein the control device is configured to set the support current, in the adjustment mode, on the basis of a fixedly predetermined value.

5. The drive apparatus according to claim 1, wherein the control device is configured to calibrate a value for the support current in a calibration routine outside of the adjustment mode, and, in the adjustment mode, to set the support current on the basis of the calibrated value.

6. The drive apparatus according to claim 1, wherein the control device is configured to energize the adjustment drive alternately in different adjustment directions when the adjustment mode is activated.

7. The drive apparatus according to claim 1, wherein the control device is configured to identify a user interaction on the interior assembly on the basis of a movement of the interior assembly when the adjustment mode is activated.

8. The drive apparatus according to claim 1, wherein the control device is configured to actuate the adjustment drive in a servo operation for providing a supporting force in the case of a manual adjustment of the interior assembly by a user, wherein the control device is configured, when the adjustment mode is activated, to identify a user interaction on the interior assembly and to start the servo operation on the basis of the identified user interaction.

9. The drive apparatus according to claim 1, wherein the control device is configured to actuate the adjustment drive in a nudging operation for moving the interior assembly after an impulse on the interior assembly brought about by a user, wherein the control device is configured to identify a user interaction on the interior assembly when the adjustment mode is activated, and to start the nudging operation on the basis of an identified user interaction.

10. The drive apparatus according to claim 1, wherein the control device is configured to evaluate an occupancy state of the interior assembly, an opening state of a vehicle door or a travel state of the vehicle, as a trigger criterion.

11. The drive apparatus according to claim 1, wherein the control device is configured to generate an indication signal as an indication of the adjustment mode for output to a user after activation of the adjustment mode.

12. The drive apparatus according to claim 1, wherein the control device comprises a load calculation module which is configured to determine a load acting on the interior assembly depending on a tilt angle of the vehicle measured about a vehicle longitudinal axis, a tilt angle of a pivot axis of the interior assembly measured about the vehicle longitudinal axis, a pitch angle of the vehicle measured about a vehicle transverse axis, a pitch angle of the pivot axis of the interior assembly measured about the vehicle transverse axis, and/or a position of the interior assembly.

13. The drive apparatus according to claim 1, wherein the actuation module is configured to determine the target value on the basis of the target force to be provided by the adjustment drive.

14. The drive apparatus according claim 1, wherein the current regulation module is configured to set the current of the adjustment drive using pulse-width modulation.

15. A method for controlling a drive apparatus for adjusting an interior assembly of a vehicle, comprising:
controlling, by means of a control device, an electromotive adjustment drive of the drive apparatus for producing an adjustment force, wherein a self-locking adjustment kinematic mechanism, driveable by the adjustment drive, is configured for transmitting an adjustment force, produced by the adjustment drive, to the interior assembly;
activating, by means of the control device, an adjustment mode for adjusting the interior assembly depending on at least one trigger criterion;
actuating, when the adjustment mode is activated and by means of the control device, the adjustment drive with a support current of a magnitude such that the interior assembly can be put into motion by a user force generated on the interior assembly manually by a user and overcoming the self-locking of the adjustment kinematic mechanism;
regulating, by means of a current regulation module of the control device, a current of the adjustment drive;
determining, by means of an actuation module of the control device, a target value depending on a load acting on the interior assembly, wherein the current regulation module regulates the current of the adjustment drive on the basis of the target value supplied by the actuation module; and
determining, by means of the actuation module, a target force, to be provided by the adjustment drive, on the basis of a load acting on the interior assembly and a target force value.

16. A computer program product, comprising commands which, when the program is executed by a computer, cause the computer to carry out the method according to claim 15.

* * * * *